(12) United States Patent
Reichardt et al.

(10) Patent No.: US 12,469,082 B2
(45) Date of Patent: Nov. 11, 2025

(54) APPLYING MACHINE LEARNING TO TELEMATICS DATA TO PREDICT ACCIDENT OUTCOMES

(71) Applicant: Allstate Insurance Company, Northbrook, IL (US)

(72) Inventors: Ross Reichardt, Chicago, IL (US); Benjamin Robertson Yeomans, Greensboro, NC (US); Larry Layne, Northbrook, IL (US); Venu Tammali, Chicago, IL (US); Kyle Patrick Schmitt, Chicago, IL (US); Eric Campbell, Chicago, IL (US); Ronald Lettofsky, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 315 days.

(21) Appl. No.: 16/815,469

(22) Filed: Mar. 11, 2020

(65) Prior Publication Data

US 2021/0287530 A1 Sep. 16, 2021

(51) Int. Cl.
*G06Q 40/08* (2012.01)
*G06F 18/25* (2023.01)
(Continued)

(52) U.S. Cl.
CPC ........... *G06Q 40/08* (2013.01); *G06F 18/251* (2023.01); *G06N 20/00* (2019.01); *G08G 1/0129* (2013.01)

(58) Field of Classification Search
CPC ............................... G06N 20/00; G06Q 40/08
See application file for complete search history.

(56) References Cited

U.S. PATENT DOCUMENTS 9,135,803 B1 9/2015 Fields et al.
9,218,626 B1 12/2015 Haller, Jr. et al.
(Continued)

FOREIGN PATENT DOCUMENTS

CA 3119428 A1 5/2019
CN 106021548 A 10/2016
(Continued)

OTHER PUBLICATIONS

Sanjay Shreenivasa, First Notification of Loss (FNOL) Machine Learning Process used for Telematics, IJSRD—International Journal for Scientific Research & Development, vol. 3, Issue 12, 2016, ISSN (online): 2321-0613, 5 pages (30-34).
(Continued)

*Primary Examiner* — Scott S Trotter
*Assistant Examiner* — William D Newlon
(74) *Attorney, Agent, or Firm* — Akerman LLP

(57) ABSTRACT

Systems and methods in accordance with embodiments of the invention can obtain and use a variety of telematics and other data to predict potential claim or accident outcomes arising from a variety of incidents, such as automobile accidents. The claim or accident outcomes, such as parts of the vehicle damaged, accident category, expected liabilities, and many others, can be predicted based on the telematics and other data, such as accelerometer data, heading data, location/GPS, barometer, gyroscope, magnetometer data, and the like. The machine learning classifiers that can be generated are trained on historical data, consisting of claims, telematics, and/or other relevant data. In a variety of embodiments, the telematics data can be captured using a telematics device installed in the vehicle and/or via a mobile device associated with the vehicle.

15 Claims, 4 Drawing Sheets

(51) Int. Cl.
*G06N 20/00* (2019.01)
*G08G 1/01* (2006.01)

(56) References Cited

U.S. PATENT DOCUMENTS

| | | | |
|---|---|---|---|
| 9,392,431 B2* | 7/2016 | Barfield, Jr. | G07C 5/008 |
| 9,886,771 B1 | 2/2018 | Chen et al. | |
| 10,137,889 B2 | 11/2018 | Pal et al. | |
| 10,304,137 B1 | 5/2019 | Genser et al. | |
| 10,304,139 B2 | 5/2019 | Bowne et al. | |
| 10,319,094 B1 | 6/2019 | Chen et al. | |
| 10,937,104 B1* | 3/2021 | Fiedler | G06Q 10/20 |
| 10,997,800 B1* | 5/2021 | Salodkar | G07C 5/0808 |
| 11,157,973 B2* | 10/2021 | Fuchs | G06Q 30/0283 |
| 11,227,452 B2* | 1/2022 | Rosenbaum | G07C 5/008 |
| 2007/0067075 A1* | 3/2007 | McMillan | G01N 21/88 701/31.4 |
| 2010/0131304 A1 | 5/2010 | Collopy et al. | |
| 2011/0040579 A1* | 2/2011 | Havens | G06Q 10/08 705/4 |
| 2014/0108058 A1 | 4/2014 | Bourne et al. | |
| 2015/0084757 A1 | 3/2015 | Annibale et al. | |
| 2015/0106129 A1 | 4/2015 | Kinney et al. | |
| 2015/0149218 A1* | 5/2015 | Bayley | B60R 21/0136 705/4 |
| 2015/0213556 A1 | 7/2015 | Haller, Jr. | |
| 2017/0221110 A1* | 8/2017 | Sullivan | G06Q 10/20 |
| 2017/0293894 A1 | 10/2017 | Taliwal et al. | |
| 2018/0260793 A1* | 9/2018 | Li | G06Q 40/08 |
| 2018/0300816 A1 | 10/2018 | Perl et al. | |
| 2018/0365772 A1 | 12/2018 | Thompson et al. | |
| 2020/0065711 A1* | 2/2020 | Clément | B60W 40/02 |
| 2021/0225155 A1* | 7/2021 | Potter | B60W 40/09 |
| 2021/0295441 A1* | 9/2021 | Mullen | G08G 1/0112 |
| 2022/0018906 A1* | 1/2022 | Brown | G08G 1/0125 |

FOREIGN PATENT DOCUMENTS

| | | |
|---|---|---|
| CN | 106600421 A | 4/2017 |
| CN | 108985716 A | 12/2018 |
| CN | 109242006 A | 1/2019 |
| KR | 20190024324 A | 3/2019 |

OTHER PUBLICATIONS

Cameron Jahn, Auto Insurance Telematics for Automated Claims Processing, https://zendrive.com/blog/insurance-telematics-claim-processing, Jul. 18, 2019, 4 pages.

Tractable, AI for motor insurance claims, https://tractable.ai/products/car-accidents, Jul. 18, 2019, 8 pages.

Terri Robinette, Could Artificial Intelligence Replace Insurance Claims Adjusters?, https://www.robinettelaw.com/blog, Oct. 5, 2018, 6 pages.

Jessica Pesantez-Narvaez et al., Predicting Motor Insurance Claims Using Telematics Data—XGBoost versus Logistic Regression, https://www.mdpi.com, Jul. 18, 2019, pp. 1-26.

Canadian Office Action for Canadian Patent Application No. 3,110,740 dated Mar. 21, 2022 (4 pages).

* cited by examiner

APPLYING MACHINE LEARNING TO TELEMATICS DATA TO PREDICT ACCIDENT OUTCOMES

FIELD OF USE

Aspects of the invention relate to computer machine learning models and more specifically to the use of telematics data to predict claim and/or accident outcomes, including damage to vehicles, persons, and other attributes associated with or resulting from a vehicular impact.

BACKGROUND

When a vehicle is involved in an accident, in cases where an insurance claim is filed, first notice of loss (FNOL) information describing the accident can be collected by an adjuster from the insured. The adjuster will often ask the insured, who were involved in an accident, what parts of the vehicle are damaged, the circumstances under which the accident occurred, any injuries to persons involved, and the like, during the First Notice of Loss ("FNOL") process. The adjuster manually enters into a computer system each of these pieces of information per the insured's representation.

However, due to the manual collection and timing of the data collection, the FNOL data can be incomplete or contain errors. For example, the insured may not report all damage and/or may not notice damage to a vehicle part, may not accurately or completely describe the circumstances behind the accident, and the like. Absent this information, the adjuster may not ask all the relevant questions and/or enter erroneous information. These types of errors in the FNOL data can result in an insurance claim not being optimally handled. Additionally, the asking, answering, and recording of the questions takes valuable time for both the insured and adjuster. In cases where one or more parties require medical attention, are incapacitated, and/or the cars and occupants are not yet in a safe location, the need for expediency is even greater. Accordingly, there is a need to quickly, accurately, and automatically determine the accident outcome.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can obtain and use a variety of telematics data to predict claim and/or accident outcomes, including damage to vehicles, persons, and other attributes associated with or resulting from one or more vehicular collisions. Machine learning classifiers can be trained based on historical accident data, historical telematics data, and other data. The telematics data can include any data captured using sensors available to a telematics device, for example, global positioning system (GPS) receivers, accelerometers, gyroscopes, magnetometers, barometers, and the like, as well as more granular data when a device predicts that an impact has occurred. In a variety of embodiments, the telematics data can be captured using a telematics device installed in the vehicle and/or via a mobile device associated with the vehicle (e.g., associated with a user who is in the vehicle as a driver, passenger, or the like).

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
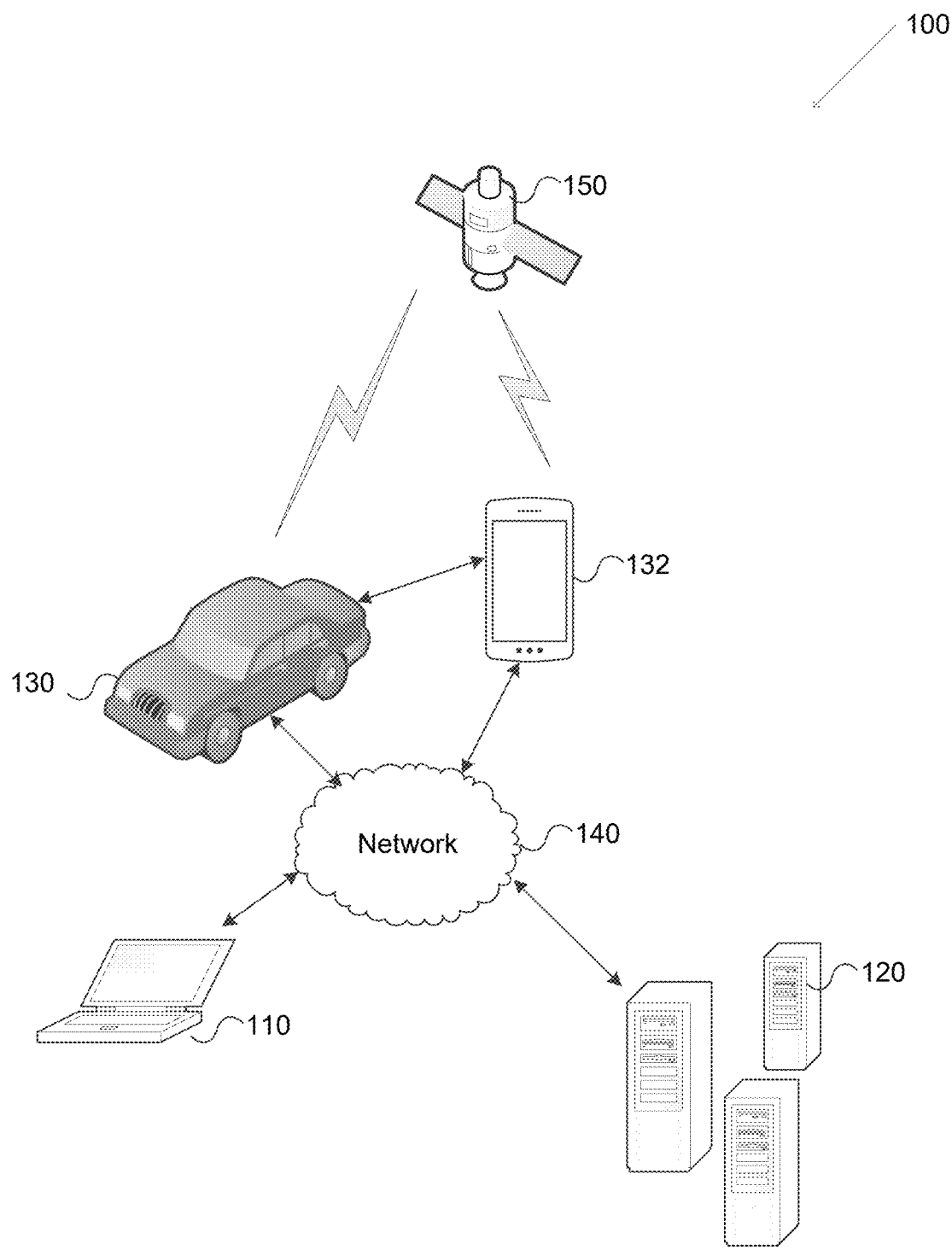
FIG. 1 illustrates an example operating environment in which one or more aspects described herein can be implemented.

In the following description of the various embodiments, reference is made to the accompanying drawings, which form a part hereof, and in which is shown by way of illustration, various embodiments of the disclosure that can be practiced. It is to be understood that other embodiments can be utilized.

Aspects described herein relate to predicting accident outcomes using a variety of telematics data. Accident outcomes can be predicted for a variety of vehicular accidents in a variety of contexts, such as car sharing applications, ride sharing applications, commercial fleet applications, personal applications, and insurance applications. Car sharing applications can include a variety of services, such as services that allow a first party to share a vehicle with a second party either directly or through one or more intermediaries. The intermediaries may perform a variety of services that, for example, match the first and second party, facilitate a transfer of the vehicle from the first party to the second party, etc. Ride sharing applications can include on-demand transportation services that allow a first party to share a ride with a second party, wherein the second party is a driver of a vehicle. Commercial applications can include business operations including fleet and operator management for any given business model that utilizes cars, trucks or other mobile equipment. Personal applications can include services that allow friends and family to keep track of one another, such as tracking, with permission, the location of a family member while driving. Accident outcomes can include a variety of outcomes of the accident such as descriptions of the accident, the results of the accident, and the results of any insurance claims arising from the accident. A vehicular accident can include damage to specific parts of vehicles, injuries to persons, damage to other property, expected liability, a nature of the accident, and the like. Accident outcomes can indicate one or more outcomes to occur as a result of an accident. Accident outcomes for vehicular accidents can include, but are not limited to, accident fault, accident type, vehicle damage to a first party vehicle, vehicle damage to a third party vehicle, impact angles, total loss, attorney representation, third party involvement, vehicle drivable, hit and run, death indicator, injury on claim, public or independent adjuster indicator, a ride share/car share indicator, estimated repair costs, fluid leak, glass damage, fraud likelihood, customer satisfaction, time until claim closes, accident location, vehicle towed from scene, and many others.

Accident fault can indicate a determination of who is legally at fault for the accident. Accident type can indicate categorical description of the type of accident that occurred. Accident types can include, but are not limited to, accidents at an intersection, accidents occurring while making a turn, insured rear-ended other vehicle, insured hit an animal, and the like. Vehicle damage can indicate damage to a specific part and/or a general area of the vehicle that was damaged in an accident. Parts of a vehicle can include, but are not limited to, front right head light, rear of vehicle, front of vehicle, and the like. In several embodiments, the vehicle damage can be to a first party vehicle and/or a third party vehicle. A first party vehicle can include any vehicle associated with a first party person. A first party person can include any person associated with the accident who has a telematics device. A third party vehicle can include any vehicle associated with a third party person. A third party person can include any person associated with the accident whether they have a telematics device or not. An impact angle can indicate the specific angle that the impact came from relative to the first party vehicle or third party vehicle. A total loss flag can indicate whether or not damage to a first party vehicle or third party vehicle exceeds the market value of the vehicle. Attorney representation flag can indicate whether or not an attorney is involved with a claim. Attorney representation can be indicated for both first party persons and third party persons. Third party involved can indicate whether there was more than one vehicle or person involved in the claim. Vehicle drivable can indicate whether a first party vehicle and/or third party vehicle is drivable. Hit and run can indicate whether a first party person and/or third party person in the accident fled the scene of the accident without exchanging information. Death indicator can indicate whether someone involved in the accident died. Injury on claim can indicate whether a person involved in the accident was injured. A public or independent adjuster flag can indicate whether an adjuster not associated with an insurer was involved. A ride/car share driver flag can indicate whether a first party person or third party person involved in the accident was involved in a car share or ride share service. Estimated repair costs can indicate a prediction of the actual dollar value of repair costs of a vehicle involved in the claim. A fluid leak can indicate a prediction of if any fluid was leaking from a first party vehicle or third party vehicle. Glass damage can indicate a prediction of if any glass was broken on a first party vehicle or third party vehicle. Fraud likelihood can indicate a prediction of if there was fraud associated with this particular accident. Customer satisfaction can indicate a prediction of how satisfied a first party person or third party person is with the claim handling process. A time until claim closes can indicate a prediction of how long it will take a claim associated with the vehicular accident to be closed. An accident location can describe the type of location where the claim or accident occurred. Accident locations can include, but are not limited to, parking lots, intersections, highways, and the like. Vehicle towed from scene can indicate whether any vehicle was towed from the scene of the accident.

When or around when a vehicular impact occurs, telematics data and/or a variety of other data can be input into the machine learning classifier described herein, and a probabilistic estimation of expected claims outcomes, accident outcomes, and the like can be output. The telematics data can include a variety of data captured using a number of sensors, such as accelerometers, gyroscopes, global positioning system receivers, etc. The machine learning classifier generated based on the telematics data can include probabilistic likelihoods that damage was sustained to particular areas of an object involved in the claim, such as an automobile, as well as predictions of future events, such as how long an adjuster will take to process a claim, who will be determined to be at fault for the claim, predicted payments by coverage, and the like. A variety of machine learning classifiers can be trained using historical claim outcomes, telematics, and other data. In a number of embodiments, the trained machine learning classifiers can be used to generate models that predict the claim and/or accident outcomes. In some embodiments, the predicted outcomes can be used to automatically resolve a claim. For example, if the predicted accident outcome is that a vehicle is totaled, the vehicle can be towed directly to a salvage yard instead of being towed to a repair facility.

These and various other arrangements will be described more fully herein. As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

FIG. 1 illustrates an operating environment 100 in accordance with an embodiment of the invention. The operating environment 100 includes at least one client device 110, at least one classification server system 120, at least one vehicle 130, and/or at least one telematics device 132 capable of collecting telematics and/or other data, in communication via a network 140. In a variety of embodiments, the telematics device 132 obtains telematics data, using sensors within the telematics device 132 and/or vehicle 130, regarding the performance of the vehicle 130. Any of the devices and systems described herein can be implemented, in whole or in part, using one or more computing devices described with respect to FIG. 2. Client devices 110, telematics devices 132, and/or classification server systems 120 can allow for individuals or entities to obtain telematics data, input the telematics into machine learning classifiers, and predict outcomes as described herein. The network 140 can include a wide area network (WAN), a wireless telecommunications network, and/or any other communication network or combination thereof.

Vehicle 130 can be, for example, an automobile, motorcycle, scooter, bus, recreational vehicle, boat, or other vehicle for which sensor data and/or any other data can be collected and analyzed. Examples of other data that can be collected can include data associated with the vehicle 130, data associated with the surroundings of the vehicle 130, data provided by one or more third party vehicles, etc. Telematics device 132 can be located within the vehicle 130 and can be used to collect telematics data, including sensor data and/or any other data regarding the vehicle 130. In several embodiments, the telematics device 132 can receive sensor and/or accident data from the vehicle 130. The telematics device 132 can be associated with a mobile device and associated with a person (such as the driver of the vehicle) and/or the telematics device 132 can be fixed and associated with the vehicle. In several embodiments, the telematics device 132 can process the data to detect an accident or non-accident event. In a variety of embodiments, the telematics device 132 can transmit the telematics data to the classification server system 120 or other computing devices. In further embodiments, the telematics device 132 can include all or a portion of the classification server system 120 on the telematics device 132, wherein the classification server system on the telematics device 132 is configure to process at least part of the telematics data and transmit all or a subset of the processed telematics data to a remote server.

Telematics device 132 can be, for example, mobile phones, personal digital assistants (PDAs), tablet computers, laptop computers, smartwatches, and other devices that can be carried by drivers or passengers inside or outside of the vehicle 130. The telematics device 132 can also be integrated into the vehicle 130 and/or connected to a data bus within the vehicle 130 via a diagnostic connector, such as an OBD-II connector. The telematics device 132 can receive a variety of data, such as acceleration, velocity, braking, impact, location, and the like from sensors located within the telematics device 132 and/or vehicle 130. For example, a telematics device having a Global Positioning System (GPS) receiver can determine vehicle location, speed, direction, and other basic driving data without needing to communicate with vehicle sensors or external vehicle systems by receiving GPS signals from one or more GPS satellites 150. However, it should be noted that any of a variety of other location determination techniques, such as location determined based on wireless networks the mobile device has connected to, such as Wi-Fi networks, cellular networks, and the like, can also be used. The sensors of the telematics device 132, such as a GPS and/or a compass, can sense the speed and/or direction at which the telematics device 132 (and accordingly vehicle 130) is traveling. An accelerometer of the telematics device 132 can sense the acceleration of the mobile device. A gyroscope can be used to measure turning of the telematics device 132. In some aspects, orientation can be detected, for example, at a rate of 90 Hz. The gyroscope can be used to measure the speed of rotation of the telematics device 132. A magnetometer can be used to measure the strength and direction of the magnetic field relative to the telematics device 132. The data collected by the telematics device 132 can be stored and/or analyzed within the telematics device 132 and/or any other computing devices described herein. The processing components of the telematics device 132 can be used to analyze sensor data and determine that an accident has or has not occurred. Additionally or alternatively, the telematics device can transmit, via a wired or wireless transmission network, the data to one or more computing devices for storage and/or analysis. In a variety of embodiments, the telematics device transmits data when it detects that an accident has occurred.

Vehicle 130 and/or telematics device 132 can further include a short-range communication system. The short-range communication systems can be a vehicle-based data transmission system configured to transmit vehicle operational data to other nearby vehicles or infrastructure, and to receive vehicle operational data from other nearby vehicles or infrastructure. Vehicle operational data can include any of the telematics data as described herein. In some examples, communication system can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. Vehicle-to-vehicle (V2V) transmissions between the short-range communication system can be sent via DSRC, Bluetooth, satellite, GSM infrared, IEEE 802.11, WiMAX, RFID, and/or any suitable wireless communication media, standards, and protocols. In certain systems, the short-range communication system can include specialized hardware installed in vehicle 130 (e.g., transceivers, antennas, etc.), while in other examples the short-range communication system can be implemented using existing vehicle hardware components (e.g., radio and satellite equipment, navigation computers) or can be implemented by software running on a telematics device within (or near) the vehicle 130. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of tollbooths, railroad crossings, parking garages, road segments, parking lots, buildings or other structures, and/or roadside traffic monitoring devices that can include one or more sensors for detecting environmental conditions (e.g., weather, lighting, etc.) as well as parking availability. Certain V2V communication systems can periodically broadcast data from vehicle 130 to any other vehicle or other infrastructure device capable of receiving the communication within the range of the vehicle's transmission capabilities. For example, vehicle 130 can periodically broadcast (e.g., every 0.1 second, every 0.5 seconds, every second, every 5 seconds, dynamically, etc.) certain vehicle operation data via its short-range communication system, regardless of whether or not any other vehicles or reception devices are in range. In other examples, a short-range vehicle communication system can first detect nearby vehicles and receiving devices, and can initialize communication with each by performing a handshaking transaction before beginning to transmit its vehicle operation data to the other vehicles and/or devices. Broadcasts from infrastructure can also have varying ranges and, in some examples, infrastructure can broadcast to an intermediate station that can then relay the information to one or more computing devices.

The types of vehicle operational data transmitted to or from vehicle 130 and/or infrastructure can depend on the protocols and standards used for the V2V or V2I communication, the range of communications, and other factors. In certain examples, vehicle 130 and/or telematics device 132 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle 130 is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V (or V2I) communications.

In various other examples, any data collected by any vehicle sensors potentially can be transmitted via V2V or V2I communication to other nearby vehicles or infrastructure devices receiving V2V or V2I communications from a short-range communication system. Further, additional vehicle driving data not from the vehicle's sensors (e.g., vehicle make/model/year information, driver insurance information, driving route information, vehicle maintenance information, driver scores, etc.) can be collected and transmitted using V2V or V2I communications to nearby vehicles and other receiving devices using the short-range communication system. In many embodiments, V2V and V2I communications can be used to obtain telematics data regarding vehicle 130 from other vehicles and/or infrastructure proximate to vehicle 130. For example, telematics device 132 can obtain location data for vehicle 130 from a location beacon via V2I communications or a passing vehicle via V2V communications. In a variety of embodiments, any of the data collected and/or transmitted using V2V and V2I can be used to transmit collected telematics data to other vehicles and/or infrastructure for processing and/or transmission to other computing devices on behalf of vehicle 130, such as to classification server system 120.

The data transferred to and from various devices in operating environment 100 can include secure and sensitive data. Therefore, it can be desirable to protect transmissions of such data using secure network protocols and encryption, and protect the integrity of the data when stored on the various computing devices within the software deployment system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. In still other examples, a security and integration layer can include specialized hardware for providing secure web services. For example, secure network appliances can include built-in features such as hardware-accelerated SSL and HTTPS, WS-Security, and/or firewalls. Such specialized hardware can be installed and configured in the operating environment 100 in front of one or more computing devices describe herein such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
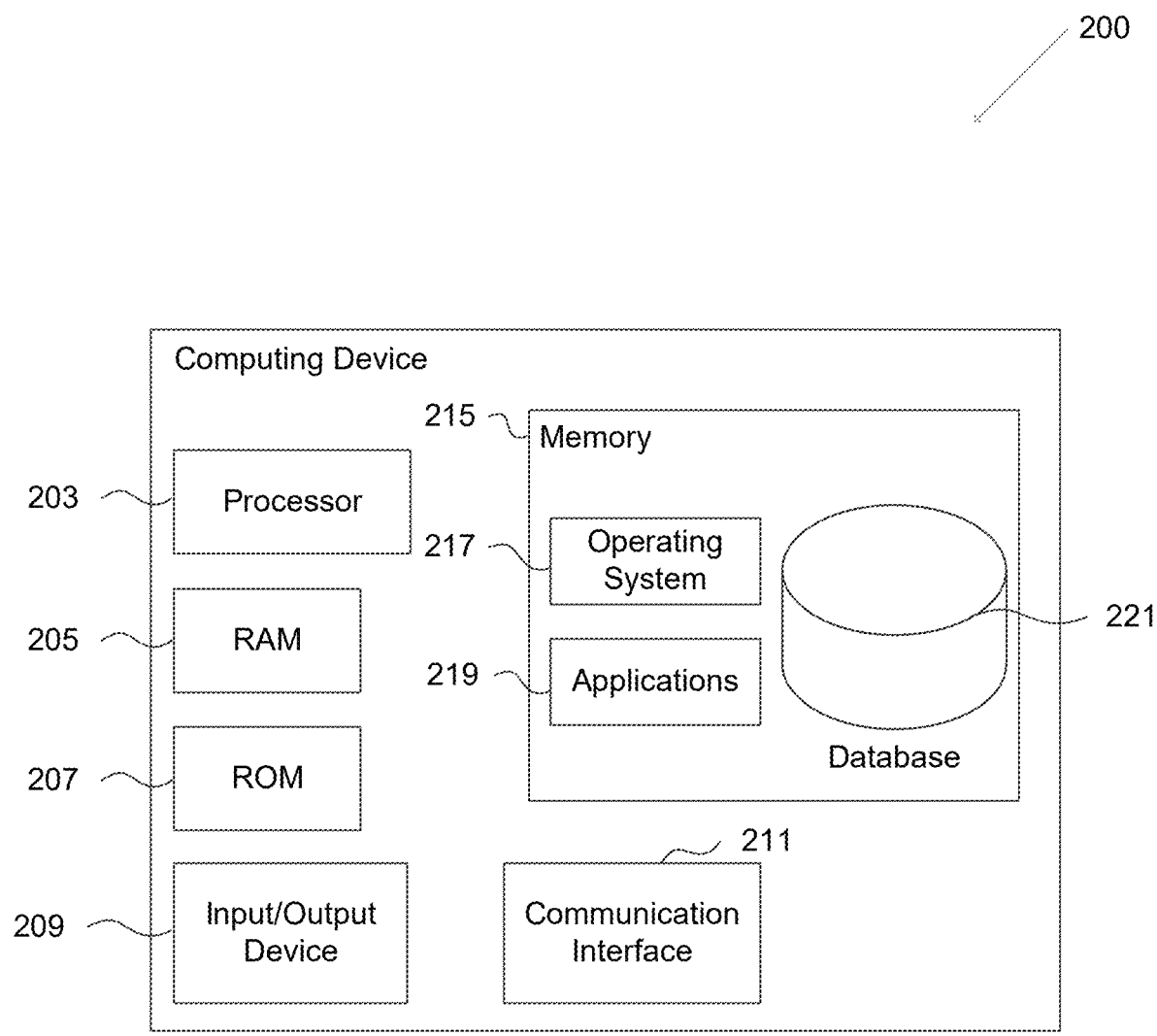
FIG. 2 illustrates one an example computing device in accordance with one or more aspects described herein.

Turning now to FIG. 2, a computing device 200 in accordance with an embodiment of the invention is shown. The computing device can be involved in implementing, in whole or in part, the various systems outlined within operating environment 100. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. In several embodiments, the software can be stored using RAM 205 and/or ROM 207. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein.

Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of software deployment systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Figure 3:
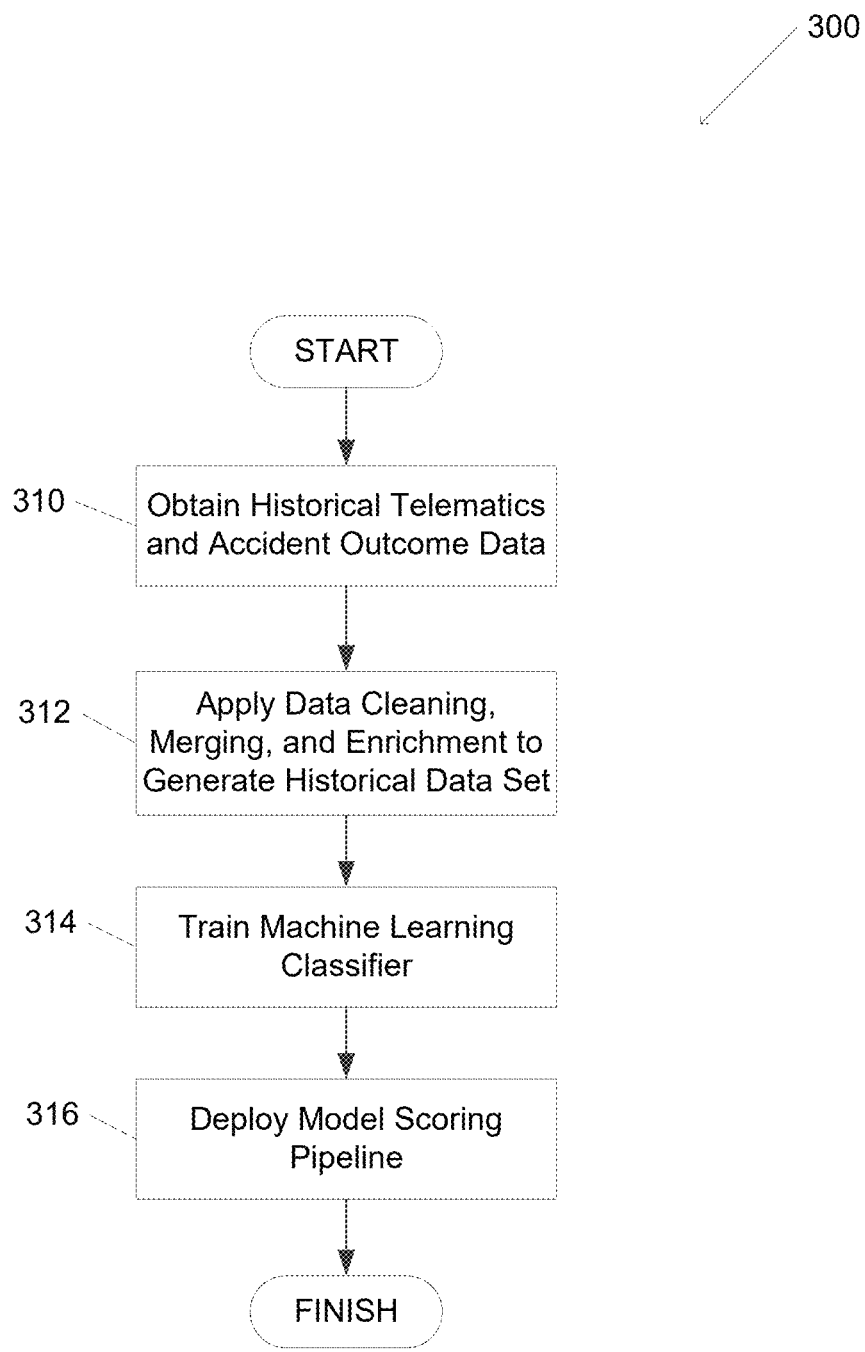
FIG. 3 is a flow chart illustrating a process for developing a model scoring pipeline in accordance with at least one aspect of the disclosure.

FIG. 3 is a flow chart illustrating a process for developing a model scoring pipeline in accordance with at least one embodiment of the invention. Some or all of the steps of process 300 can be performed using any of the computing devices and/or combination thereof described herein. In a variety of embodiments, some or all of the steps described below can be combined and/or divided into sub-steps as appropriate.

At step 310, historical telematics data and other data, such as accident outcome data can be obtained. Historical telematics data can include acceleration data, speed data, braking data, heading data, location data, impact data, data identifying the vehicle and/or passengers, and/or any other data as appropriate for predicting claim or accident outcomes. Historical outcome data can include any of a variety of outcomes, such as repairing a vehicle, totaling a vehicle, a likelihood of litigious activity, a settlement amount, and/or any other outcome related to a historical vehicular accident. Any telematics data and/or accident outcome described herein can be indicated in the historical telematics data and historical accident outcome data.

At step 312, the historical telematics data and accident outcome data can be cleaned, merged, and/or enriched. In several embodiments, cleaning the historical telematics data includes converting data at differing sampling rates to a common sampling rate. The data can be up-sampled and/or down-sampled to generate data at the common sampling rate. In several embodiments, cleaning the historical telematics data can include converting some or all the historical telematics data to a different measurement format. For example, accelerometer data can be measured in meters per second and converted to a g-force measurement. Merging the historical telematics data can include computing vectors based on sample acceleration data and/or heading data, calculating acceleration signals based on the computed vectors, and/or determining peaks and/or valleys within the acceleration signals. In a variety of embodiments, merging the historical telematics data includes comparing speed measured using a speed sensor to speed calculated based on acceleration values and calculating a true vehicle speed based on the different speed values at a particular time. Enriching the historical telematics data can include incorporating data from a variety of external databases, such as weather databases, location databases, risk maps, and the like, that provide additional contextual data regarding the vehicle and/or the location of the vehicle. For example, enriching the historical telematics data can include determining if the vehicle was in an intersection based on the GPS coordinates indicated in the historical telematics data. In another example, enriching the historical telematics data can include determining the weather conditions at the location of the vehicle at the time the vehicular accident occurred. In a third example, enriching the historical telematics data can include determining the speed limit on the road the vehicle was traveling at the time the vehicular accident occurred using a risk map. The cleaned, merged, and enriched historical telematics data describing one or more historical vehicular accidents can be stored as a historical data set for further processing.

At step 314, a machine learning classifier can be trained. A machine learning classifier can be trained based on the historical data set and the historical outcome data, as the historical outcome data indicates the ground truth labels associated with each vehicular accident indicated in the historical data set. In several embodiments, training the machine learning classifier includes automatically updating one or more weights and optimizing hyperparameters associated with a machine learning model utilized by the machine learning classifier to generate probabilistic likelihoods of particular events being associated with particular features within a data set. In this way, the performance of the machine learning classifiers can be improved based on the resolution process to improve the ability of the computing devices described herein to classify vehicular accidents and generate correct outcomes. A variety of machine learning classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning classifiers can be utilized, more specific machine learning classifiers when available, and general machine learning classifiers at other times can further increase the accuracy of predictions.

At step 316, a model scoring pipeline can be deployed. The model scoring pipeline can include the trained machine learning classifier. The model scoring pipeline can be deployed to one or more computing devices in a computing environment. In several embodiments, the model scoring pipeline is deployed to a telematics device, such as a mobile phone, associated with an occupant of a vehicle. In many embodiments, the model scoring pipeline is deployed to a classification server system. Once deployed, the model scoring pipeline can be used to process a variety of telematics data as described herein.

Figure 4:
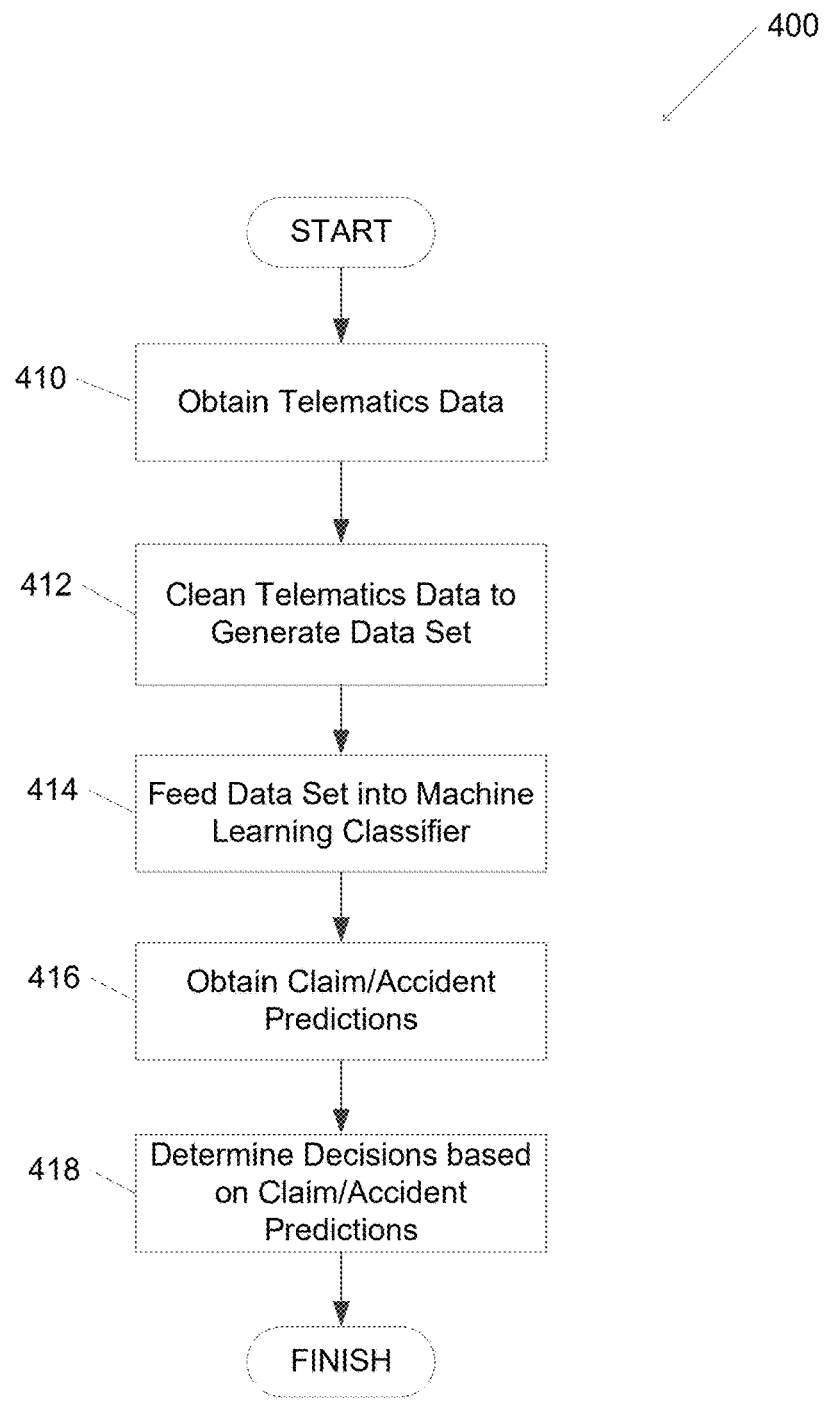
FIG. 4 is a flow chart illustrating a process for processing telematics data in accordance with at least one aspect of the disclosure.

FIG. 4 is a flow chart illustrating a process for processing telematics data in accordance with at least one embodiment of the invention. Some or all of the steps of process 400 can be performed using any of the computing devices and/or combination thereof described herein. In a variety of embodiments, some or all of the steps described below can be combined and/or divided into sub-steps as appropriate.

At step 410, telematics data can be obtained. The telematics data can be obtained from a telematics device associated with a vehicle. The telematics device can be installed in the vehicle and/or can be a mobile device associated with one or more persons in the vehicle (e.g., driver, passenger, etc.). The telematics data can include acceleration data, speed data, braking data, heading data, location data, impact data, data identifying the vehicle and/or passengers, and/or any other data as appropriate. Each piece of data within the telematics data can be sampled at a particular sample rate. The sampling rate of the data can be determined based on the sensor used to capture the data and/or the type of data being captured. For example, acceleration data captured using an accelerometer can be captured at a sampling rate of 100 Hz, while location data and heading data captured using a GPS receiver can be captured at a sampling rate of 1 Hz. The obtained telematics data can also include data captured using multiple telematics devices and/or telematics devices associated with multiple vehicles involved in (or proximate to) a vehicular accident. In a variety of embodiments, the telematics data can also be enriched with human-provided data, such as data collected as part of a claim reported to an insurance company related to the vehicular accident, and/or data from a police report regarding the accident.

The amount of data transmitted by a telematics device can be adjusted based on the potential occurrence of an incidence, such as a vehicle accident. For example, the telematics device can send telematics data every 5 minutes, but if a vehicular accident is predicted to have occurred, the telematics device can transmit all data captured over the previous 10 minutes. In another example, when an acceleration with a magnitude greater than a threshold acceleration is measured, the telematics device can transmit the telematics data, which can be used to predict a claim and/or accident outcome. In yet further examples, when other telematics data reaches or otherwise meets a specific criterion, the telematics device can transmit the telematics data for use in predicting a claim and/or accident outcome. For instance, the telematics device can transmit telematics data when an acceleration exceeding a g-force of 4 g is measured in at least three out of five samples. In such instances, the telematics device can transmit data at a higher frequency (e.g. transmitting a packet with 100 points of accelerometer data per second, whereas normally accelerometer data transmitted is at 1 data point per second). The telematics device can transmit higher frequency historical data as well. For example, in some embodiments accelerometer data could normally be recorded at a rate of 1/10 hertz (i.e. one accelerometer point every 10 seconds), but if a device predicts that a vehicle accident is likely to have occurred, the telematics device can retrieve and transmit data occurring before the accident, at time of accident, and after the accident at a higher rate, such as 100 hertz.

The telematics device can transmit a variety of telematics data. For example, the transmitted telematics data may be a subset and/or an aggregation of raw sensor data captured using the sensors associated with the telematics device. In another example, the telematics data includes a stream of raw sensor data captured using the telematics device. In another example, the amount of telematics data, rate at which the telematics data is transmitted, prioritization of what telematics data is transmitted and when, etc. may be based on the predicted claims and/or accident outcome. For instance, if telematics data, such as acceleration data, is predictive of a vehicle accident, such as total loss, the telematics device may stream the raw data rather than send accumulated data to avoid potential loss of data should the telematics device be damaged in a vehicle accident. Other examples also exist.

At step 412, a data set can be generated. Generating a data set can include cleaning, merging, and/or enriching the obtained telematics data. In several embodiments, cleaning the telematics data includes generating low frequency data based on the telematics data. Generating the low frequency data can include converting data at differing sampling rates to a common sampling rate. The data can be up-sampled and/or down-sampled in order to generate data at the common sampling rate. For example, acceleration data can be sampled at 100 Hz, location data can be sampled at 1 Hz, and the common sampling rate can be 50 Hz. In this example, the telematics data can include one second worth of data, which can include 100 acceleration measurements and two location measurements. The acceleration data can be averaged in two sample increments to down sample the acceleration data from 100 Hz to 50 Hz. The acceleration data can be combined with speed data and the location data to interpolate the location of the vehicle over the sampling period, in increments over the one second sampling period, based on the initial location data and the final location, thereby up-sampling the location data to 50 Hz. The time window can establish a period of time for which the computing device makes acceleration measurements for the purposes of predicting a claim and/or accident outcome. The time window can be represented in a variety of ways, including as a time value, such as 5 milliseconds, and/or as a number of acceleration measurements, such as 7 measurements. Other exemplary, non-limiting examples of the number of acceleration measurements include 3, 5, and 10 measurements. In several embodiments, generating the low frequency data can include converting some or all of the telematics data to a different measurement format. For example, accelerometer data can be measured in meters per second and converted to a g-force measurement. Merging the telematics data can include computing vectors based on sample acceleration data and/or heading data, calculating acceleration signals based on the computed vectors, and/or determining peaks and/or valleys within the acceleration signals. In a variety of embodiments, merging the telematics data includes comparing speed measured using a speed sensor to speed calculated based on acceleration values and calculating a true vehicle speed based on the different speed values at a particular time.

Enriching the telematics data can include incorporating data from a variety of external databases, such as weather databases, location databases, risk maps, and the like, that provide additional contextual data regarding the vehicle and/or the location of the vehicle. For example, enriching the telematics data can include determining if the vehicle is in an intersection based on the GPS coordinates indicated in the telematics data. In another example, enriching the telematics data can include determining the weather conditions at the location of the vehicle at the time the vehicular accident occurred. In a third example, enriching the telematics data can include determining the speed limit on the road the vehicle was traveling at the time the vehicular accident occurred using a risk map.

The generated data set can include a set of latent features identifying particular areas and/or parts of the object involved in the vehicular accident. The areas and/or parts can include general areas and specific areas. General areas for a vehicle can include features corresponding to the rear of the vehicle, the interior of the vehicle, the front of the vehicle, the driver side of the vehicle, the passenger side of the vehicle, the roof of the vehicle, the undercarriage of the vehicle, and the mechanicals of the vehicle. Specific areas that can be indicated by features in the generated data set include driver side exterior rear door glass, driver side front door, driver side front door glass, driver side front fender, driver side front tire, driver side front wheel cover, driver side mirror, driver side rear door, driver side rear quarter panel, driver side rear tire, driver side rear wheel cover, front bumper, front grille, front headlight driver side, front headlight passenger side, front hood, front windshield, interior air bag, interior steering column, interior wiring, mechanical engine, mechanical exhaust system, mechanical radiator, mechanical transmission system, other frame, other roof, other undercarriage, passenger side front door, passenger side front door glass, passenger side front fender, passenger side front tire, passenger side front wheel cover, passenger side mirror, passenger side rear door, passenger side rear door glass, passenger side rear quarter panel, passenger side rear tire, passenger side rear wheel cover, rear body panel, rear bumper, rear glass, rear taillight driver side, rear taillight passenger side, rear trunk/tailgate/hatch. Depending on the make and/or model of the vehicle, a specific area can be located in one or more general areas of the vehicle.

At step 414, a data set can be classified using a machine learning classifier. The data set can be classified using, for example, the machine learning classifier trained in step 314 for similar vehicular accidents. Data sets generated from telematics data can be similar to historical data sets even when the underlying telematics data used to generate the data set and the historical data set differ. A similar vehicular accident can include a previously generated data set that is statistically similar to the generated data set. In several embodiments, machine learning classifiers trained using historical data sets and outcomes can be used to generate probabilistic likelihoods of damage to particular features in the generated data set. In a number of embodiments, the data set can be classified using one or more machine learning classifiers. A variety of machine learning classifiers as trained and described herein can be utilized to classify the data set.

At step 416, claim/accident predictions can be obtained. The claim/accident predictions can include a variety of potential outcomes of a claim involving the classified data set. The potential outcomes can be determined based on historical outcomes for historical vehicular accidents having similar data sets. The claim/accident predictions can include any of a variety of predicted outcomes, such as repairing a vehicle, totaling a vehicle, a likelihood of litigious activity, a settlement amount, and/or any other outcome related to the claim.

The data set can be classified based on a statistical similarity of the generated data set to historical data sets. The statistical similarity of the generated data set to historical data sets can be determined using one or more machine learning classifiers trained using historical data sets and/or historical resolutions to vehicular accidents described by the data sets. The machine learning classifiers can also calculate a probabilistic likelihood that one or more areas of the vehicle have been damaged based on the features indicated in the data set, which may include one or more latent features in the generated data set. The probabilistic likelihood of damage can be calculated based on actual damage to particular areas of the vehicle corresponding to features in the historical data sets. That is, when features of the generated data set are similar to features of a historical data set, it is statistically likely that similar damage occurred to the same areas of the vehicle involved in the instant vehicular accident and the vehicle involved in the historical vehicular accident(s). Similarly, it is statistically unlikely that damage to a particular area of a vehicle occurs when damage to the particular area of the vehicle indicated in historical models having similar features to the generated data set does not indicate that damage occurred to the particular area. For example, if a historical data set shows that vehicles with only a frontal impact are statistically unlikely to have damage to a rear bumper then the computing device may predict, based on telematics data, that in instances where only a frontal impact is predicted, rear bumper damage will be unlikely. It can be statistically more likely that the rear bumper of the vehicle has been damaged when the historical data set indicates that the vehicle has likely suffered a rear impact in addition to the frontal impact. The likelihood of similarity of damage to a particular area can be based on the features of the data sets, the make and/or model of the vehicle, the location at which the vehicular accident occurred, and/or any other data as appropriate.

In embodiments, the computing device may label one or more latent features in the data set based on related or otherwise similar latent features in the historical data set. The latent features may be used, for example, to predict potential damage to a vehicle that is likely to have been in an accident, wherein the predicted potential damage may describe the type of damage, location of damage, severity of damage, and a probabilistic likelihood that the feature and/or damage is present. For example, latent features can include how fast the vehicle was traveling, how quickly the vehicle decelerated, how long the vehicle was stopped, the potential angle of impact, and/or the potential magnitude of the impact. A damage indicator for a particular area of the vehicle that has been damaged or is predicted to have been damaged can be binary and/or have a severity level. In many embodiments, the severity level can include a probabilistic likelihood that the predicted damage to the area corresponds to the determined severity level. For example, based on the features within the data set, it can be determined that it is 25% likely that a front driver door experienced minor damage and 75% likely that the front driver door experienced major damage. The division between "major" and "minor" damage could be split based on various thresholds and partitions. For example, "major" damage could be defined as any damage where the predicted cost of repair exceeds a prespecified dollar amount, a measure of the expected future lifetime of the part or any other similar kind of measure. In other embodiments, the division between major and minor damage could be further refined into three or more buckets. It should be noted that any actual or predicted damage to a vehicle, including any damage or accident outcomes described herein, can be identified in the claim/accident predictions.

The accident/outcome predictions can include one or more potential accident outcomes and/or a probabilistic likelihood that a particular accident outcome will actually occur for a claim associated with the generated data set. The potential accident outcomes can be generated based on historical outcomes to similar vehicular accidents. In some embodiments, features describing an event indicated in the obtained data set include how fast the vehicle was traveling, how quickly the vehicle decelerated, how long the vehicle was stopped, the angle of impact, and/or the magnitude of the impact. Some or all of these features, along with the probabilistic likelihood of damage to one or more areas of the vehicle, can be used to determine historical outcomes for similar historical data sets. In a number of embodiments, one or more machine learning classifiers can be used to generate probabilistic likelihoods indicating that one or more outcomes will occur for the obtained data set based on the ground truth historical outcomes that did occur for the historical data sets. Potential outcomes include, but are not limited to, first party total loss, third party total loss, any total loss, claimant obtains an attorney, third party vehicle drivable, first party vehicle drivable, an allocation of fault to the parties involved in the vehicular accident, a hit and run flag, an estimated time to resolve the claim, a backing accident with both parties moving, changing lanes, head-on collision, insured hit a fixed object, insured hit an animal, intersection accident, making a turn, insured hit parked vehicle, rear-end accident with the other party rear-ending the insured, rear-end accident with the insured rear-ending other party, rear-end accident with multiple cars, sideswipe accident, bodily injury claims, property damage claim, collision claim, a comprehensive claim, a personal injury protection claim, and/or a vehicle towed from scene. The potential outcomes can also include an estimated time to resolve a claim and/or the total cost of a claim associated with the vehicular accident. The likelihood of certain outcomes occurring can affect the likelihood of other outcomes occurring. For example, a potential outcome can include a likelihood that one or more parties involved in the vehicular accident will obtain attorney representation. Attorney representation can significantly affect the costs associated with resolving a claim and the time necessary to resolve the claim. Accordingly, the likelihood of a particular outcome can be weighted based on the likelihood of other outcomes occurring. The predicted accident outcomes can include discrete outcomes and/or a range of outcomes as appropriate.

At step 418, decisions can be made based on the claim/accident predictions. The decisions can be determined based on the obtained claim/accident predictions. For example, an adjuster can be automatically provided with a set of predicted outcomes within seconds of receiving a call from a driver of the vehicle regarding a potential vehicular accident. In several embodiments, the decisions can be automatically determined by a computing device based on the probabilistic likelihood that one or more of the generated outcomes will be a necessary step in the claim process and/or will resolve the claim. For example, a tow truck can automatically be dispatched with a target destination when the classified data set indicates that the likely outcome of the vehicular accident will likely require repairing the vehicle. The target destination can be a repair facility and/or a salvage facility depending on the predicted damage to the vehicle. For example, if the classified data set indicates that the rear half of the vehicle is likely irreparably damaged or a total loss has occurred, the tow truck can be automatically dispatched to transport the vehicle to a salvage facility. In another example, when the classified data set indicates that the front quarter panel of the vehicle is dented, the tow truck can be automatically dispatched to transport the vehicle to a repair facility. In a third example, when the only damage to the vehicle includes a cracked window, a window repair truck can be automatically dispatched with a replacement windshield that fits the specific vehicle indicated in the telematics data. In several embodiments, the decisions can be determined based on one or more insurance policies associated with the vehicle involved in the vehicular accident. For example, a decision regarding a claim payoff amount can be determined based on an estimated cost to repair the damage to the vehicle and the probabilistic likelihood that the estimated cost is accurate.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular data types when executed by a processor in a computer or other device. The modules can be written in a source code programming language that is subsequently compiled for execution, or can be written in a scripting language such as (but not limited to) HTML or XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:
1. A method, comprising:
obtaining, by a classification server system having a wireless network connection with a telematics device, telematics data comprising acceleration data, speed data, and heading data for a vehicle;

based on a determination that the telematics data indicates that an acceleration of the vehicle has exceeded a predefined g-force threshold in a predefined number of samples, increasing an upload frequency of the telematics data, wherein the telematics data indicating that the acceleration of the vehicle has exceeded the predefined g-force threshold in the predefined number of samples indicates that the vehicle has been involved in a vehicular accident, wherein the increased upload frequency of the telematics data causes an increased amount of the telematics data to be transmitted per each period of time of transmittal of the telematics data, wherein the telematics data includes data that occurred before the acceleration of the vehicle exceeded the predefined g-force threshold, data that occurred at the time the acceleration of the vehicle exceeded the predefined g-force threshold, and data that occurred after the acceleration of the vehicle exceeded the predefined g-force threshold;

obtaining, by the classification server system, the telematics data at the increased upload frequency;

generating, by the classification server system, common sampling rate data based on the telematics data, wherein the common sampling rate data comprises the acceleration data sampled at a first sampling rate using an accelerometer and location data sampled at a second sampling rate using a GPS receiver, the first sampling rate and the second sampling rate converted to a common sampling rate;

generating, by the classification server system and based on the common sampling rate data, a data set comprising a set of latent features associated with divided severity level buckets by:

training a machine-learning classifier to label the data set into a plurality of severity level buckets corresponding to at least a major severity label and a minor severity label by providing the machine-learning classifier:

historical accident outcome data including repair cost amount values; and predefined cost amount thresholds which define the major severity label and the minor severity label;

obtaining, by the machine-learning classifier of the classification server system, accident predictions for the vehicle involved in the vehicular accident by classifying the data set based on historical telematics data and the historical accident outcome data, the historical telematics data and the historical accident outcome data having a predefined statistical similarity to the vehicular accident;

determining, by the classification server system, a decision for the vehicle based on the accident predictions;

based on the decision for the vehicle, automatically causing a tow truck to be dispatched to a location associated with the vehicle, with a target destination to which the tow truck is to tow the vehicle to;

calculating a predicted cost associated with the accident predictions by providing the machine-learning classifier the accident predictions for the vehicle; and optimizing the machine-learning classifier by automatically updating a hyperparameter of the machine-learning classifier, based on the predicted cost associated with the accident predictions for the vehicle.

2. The method of claim 1, wherein the historical accident outcome data comprises data indicating parts damaged and liabilities for a vehicle involved in a historical vehicular accident.

3. The method of claim 1, wherein a classified data set comprises a set of damage areas for the vehicle and a probabilistic likelihood that each damage area of the vehicle is damaged based on the telematics data.

4. The method of claim 3, wherein the accident predictions further comprise a severity level for each damage area.

5. The method of claim 1, wherein the decision is selected from a group comprising of repairing the vehicle and totaling the vehicle.

6. A computing device, comprising:

one or more processors; and memory storing instructions that, when executed by the one or more processors, cause the computing device to:

obtain, using a wireless network connection with a telematics device, telematics data for a vehicle;

based on a determination that the telematics data indicates that an acceleration of the vehicle has exceeded a predefined g-force threshold in a predefined number of samples, increase an upload frequency of the telematics data, wherein the telematics data indicating that the acceleration of the vehicle has exceeded the predefined g-force threshold in the predefined number of samples indicates that the vehicle has been involved in a vehicular accident, wherein the increased upload frequency of the telematics data causes an increased amount of the telematics data to be transmitted per each period of time of transmittal of the telematics data, wherein the telematics data includes data that occurred before the acceleration of the vehicle exceeded the predefined g-force threshold, data that occurred at the time the acceleration of the vehicle exceeded the predefined g-force threshold, and data that occurred after the acceleration of the vehicle exceeded the predefined g-force threshold;

obtain, using the wireless network connection with the telematics device, the telematics data at the increased upload frequency;

generate common sampling rate data based on the telematics data, wherein the common sampling rate data comprises acceleration data sampled at a first sampling rate using an accelerometer and location data sampled at a second sampling rate using a GPS receiver, the second sampling rate is a same rate as the first sampling rate;

generate, based on the common sampling rate data, a data set comprising a set of latent features associated with divided severity level buckets by:

training a machine-learning classifier to classify the data set into a plurality of severity level buckets corresponding to at least a major severity label and a minor severity label by providing the machine-learning classifier:

historical accident outcome data including repair cost amount values; and predefined cost amount thresholds which define the major severity label and the minor severity label;

obtain, by the machine-learning classifier, accident predictions for the vehicle involved in the vehicular accident by classifying the data set based on a set of historical outcome data for a historical vehicle accidents data set, the historical vehicle accidents data set having a predefined similarity to the vehicular accident;

determine a decision for the vehicle based on the accident predictions;

based on the decision for the vehicle, automatically cause a tow truck to be dispatched to a location associated with the vehicle, with a target destination to which the tow truck is to tow the vehicle to;

calculate a predicted cost associated with the accident predictions by providing the machine-learning classifier the accident predictions for the vehicle; and optimize the machine-learning classifier by automatically updating a hyperparameter of the machine-learning classifier, based on the predicted cost associated with the accident predictions for the vehicle, thus enhancing prediction outcomes of the machine-learning classifier.

7. The computing device of claim 6, wherein the historical accident outcome data comprises data indicating parts damaged and liabilities for a vehicle involved in a historical vehicular accident.

8. The computing device of claim 6, wherein a classified data set comprises a set of damage areas for the vehicle and a probabilistic likelihood that each damage area of the vehicle is damaged based on the telematics data.

9. The computing device of claim 8, wherein the accident predictions further comprise a severity level for each damage area.

10. The computing device of claim 6, wherein the determined decision is selected from a group comprising of repairing the vehicle and totaling the vehicle.

11. A non-transitory machine-readable medium storing instructions that, when executed by one or more processors, cause the one or more processors to perform steps comprising:

obtaining, using a wireless network connection with a telematics device, telematics data comprising acceleration data, speed data, and heading data for a vehicle;

based on a determination that the telematics data indicates that an acceleration of the vehicle has exceeded a predefined g-force threshold in a predefined number of samples, increasing an upload frequency of the telematics data, wherein the telematics data indicating that the acceleration of the vehicle has exceeded the predefined g-force threshold in the predefined number of samples indicates that the vehicle has been involved in a vehicular accident, wherein the increased upload frequency of the telematics data causes an increased amount of the telematics data to be transmitted per each period of time of transmittal of the telematics data, wherein the telematics data includes data that occurred before the acceleration of the vehicle exceeded the predefined g-force threshold, data that occurred at the time the acceleration of the vehicle exceeded the predefined g-force threshold, and data that occurred after the acceleration of the vehicle exceeded the predefined g-force threshold;

obtaining, using the wireless network connection with the telematics device, the telematics data at the increased upload frequency;

generating common sampling rate data based on the telematics data, wherein the common sampling rate data comprises acceleration data sampled at a first sampling rate using an accelerometer and location data sampled at a second sampling rate using a GPS receiver, the second sampling rate is a same rate as the first sampling rate;

generating, based on the common sampling rate data, a data set comprising a set of latent features associated with divided severity level buckets by:

training a machine-learning classifier to label the data set into a plurality of severity level buckets corresponding to at least a major severity label and a minor severity label by providing the machine-learning classifier:

historical accident outcome data including repair cost amount values; and predefined cost amount thresholds which define the major severity label and the minor severity label;

obtaining by the machine-learning classifier, accident predictions for the vehicle involved in the vehicular accident by classifying the generated data set based on a set of historical outcome data for a historical vehicle accidents data set, the historical vehicle accidents data set having a predefined statistical similarity to the vehicular accident;

determining a decision for the vehicle based on the accident predictions;

based on the decision for the vehicle, automatically causing a tow truck to be dispatched to a location associated with the vehicle, with a target destination to which the tow truck is to tow the vehicle to;

calculating a predicted cost associated with the accident predictions by providing the machine-learning classifier the accident predictions for the vehicle; and updating a hyperparameter of the machine-learning classifier, based on the predicted cost associated with the accident predictions for the vehicle.

12. The non-transitory machine-readable medium of claim 11, wherein a historical accident outcome data comprises data indicating parts damaged and liabilities for a vehicle involved in a historical vehicular accident.

13. The non-transitory machine-readable medium of claim 11, wherein a classified data set comprises a set of damage areas for the vehicle and a probabilistic likelihood that each damage area of the vehicle is damaged based on the telematics data.

14. The non-transitory machine-readable medium of claim 13, wherein the accident predictions further comprise a severity level for each damage area.

15. The method of claim 1, further comprising:

changing a transmit time for the telematics data based on the accident predictions for the vehicle.

* * * * *